United States Patent [19]
Moulton

[11] Patent Number: 6,063,282
[45] Date of Patent: May 16, 2000

[54] SIMULTANEOUS FILTRATION OF NUMEROUS SAMPLES USING MICROFIBERS

[75] Inventor: Thomas Moulton, San Francisco, Calif.

[73] Assignee: LABCON, North America, San Rafael, Calif.

[21] Appl. No.: 09/219,085

[22] Filed: Dec. 22, 1998

[51] Int. Cl.$^7$ ............................. B01D 37/00; B01D 35/02; B01L 11/00

[52] U.S. Cl. ........................... 210/650; 210/767; 210/781; 210/808; 210/323.1; 210/360.1; 210/406; 210/416.1; 210/321.89; 422/101; 422/102; 422/104; 435/809; 436/178; 436/809

[58] Field of Search .................................. 210/650, 767, 210/323.1, 455, 321.78, 321.79, 321.8, 321.88, 321.89, 787, 808, 416.1, 406, 360.1, 781; 435/809; 436/177–178, 809; 422/99, 101, 102, 104

[56] References Cited

U.S. PATENT DOCUMENTS

| | | | |
|---|---|---|---|
| Re. 30,562 | 3/1981 | Park | 435/296 |
| 3,685,970 | 8/1972 | Moir | 23/253 |
| 4,481,959 | 11/1984 | Byrne | 131/336 |
| 4,507,107 | 3/1985 | Berger | 493/44 |
| 4,869,275 | 9/1989 | Berger | 131/332 |
| 4,948,564 | 8/1990 | Root et al. | 422/101 |
| 5,108,704 | 4/1992 | Bowers et al. | 422/70 |
| 5,110,556 | 5/1992 | Lyman et al. | 422/101 |
| 5,141,719 | 8/1992 | Fernwood et al. | 422/101 |
| 5,160,704 | 11/1992 | Schlüter | 422/101 |
| 5,417,923 | 5/1995 | Bojanic et al. | 422/101 |
| 5,509,430 | 4/1996 | Berger | 131/341 |
| 5,516,490 | 5/1996 | Sanadi | 422/101 |
| 5,607,766 | 3/1997 | Berger | 428/373 |
| 5,620,641 | 4/1997 | Berger | 264/103 |
| 5,650,323 | 7/1997 | Root | 435/284 |
| 5,804,684 | 9/1998 | Su | 536/25 |
| 5,846,493 | 12/1998 | Bankier et al. | 422/101 |

*Primary Examiner*—Robert Popovics
*Attorney, Agent, or Firm*—Finley & Berg, L.L.P.

[57] ABSTRACT

A filtration apparatus for extracting particles from a fluid sample is provided. The filtration apparatus comprises a filtration well plate which forms one or more filtration wells. Each filtration well has a proximal chamber into which the fluid sample may be deposited and a distal channel into which a filter is fitted. Each filter comprises a plurality of vertically oriented cylindrical micro fibers defining a set of vertically oriented linear pores. Upon application of a sufficient downward force to the fluid sample, the fluid sample is driven into the filter and the particles are expelled from a lower end of the filter.

18 Claims, 4 Drawing Sheets

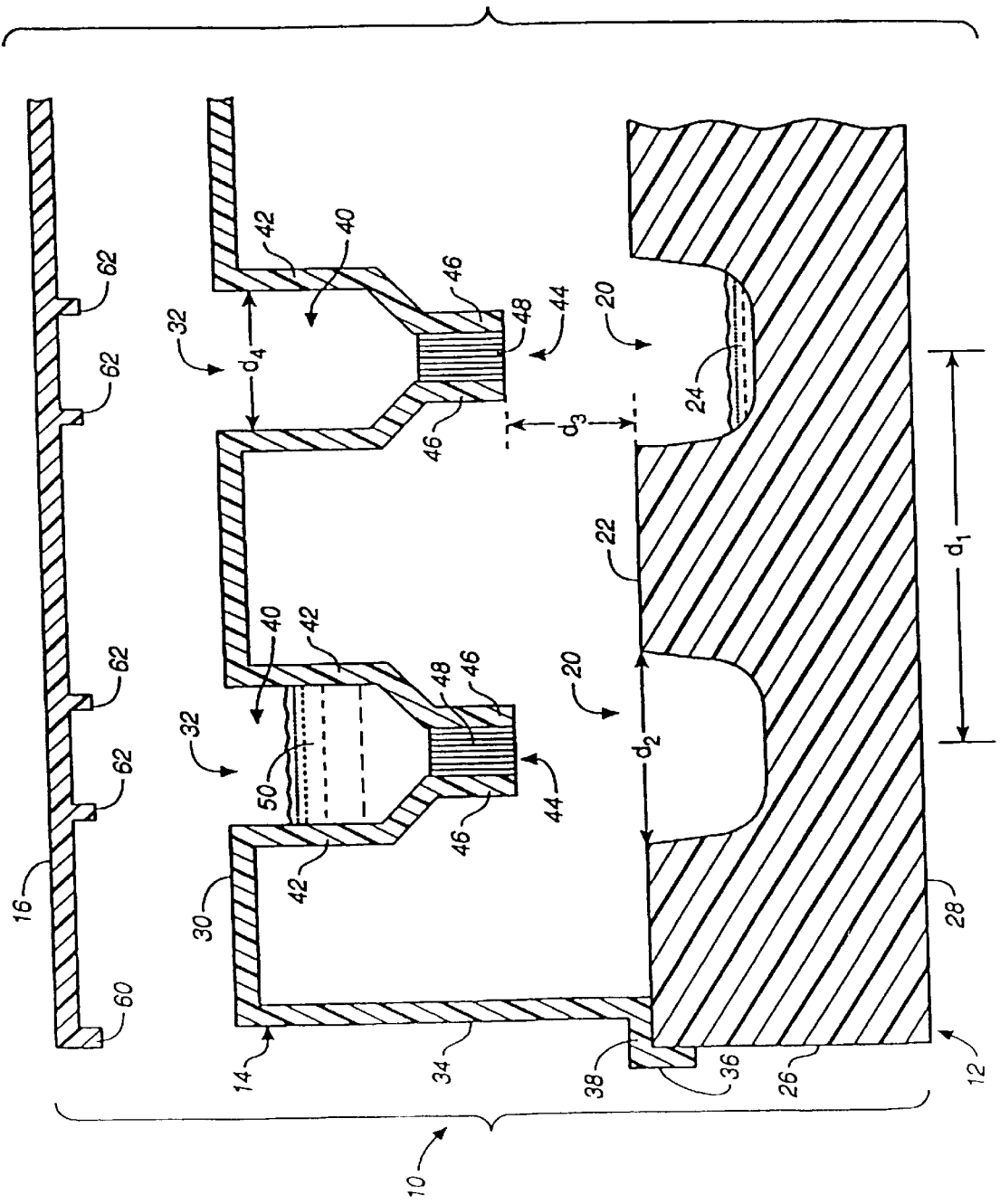
FIG._1

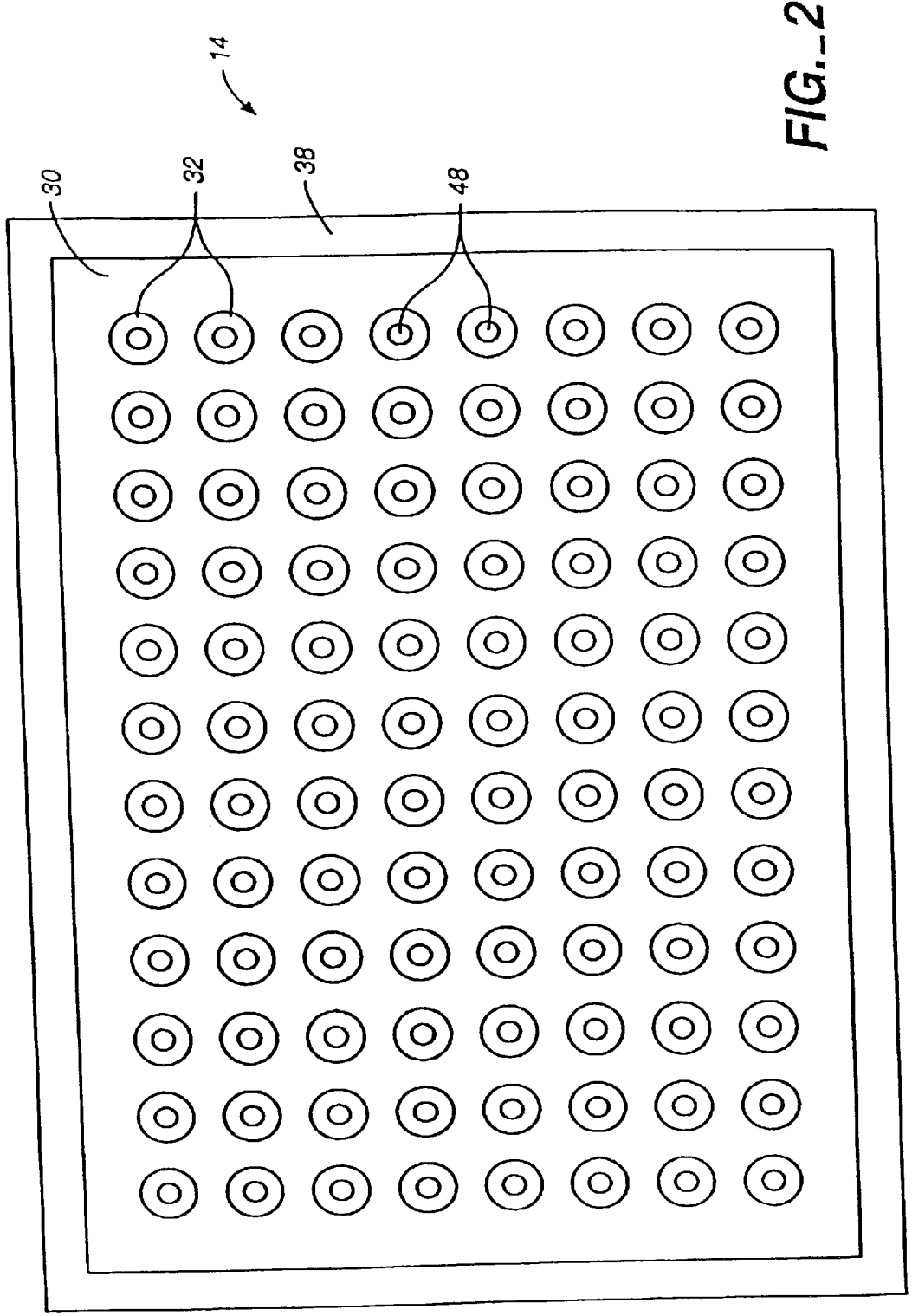
FIG._2

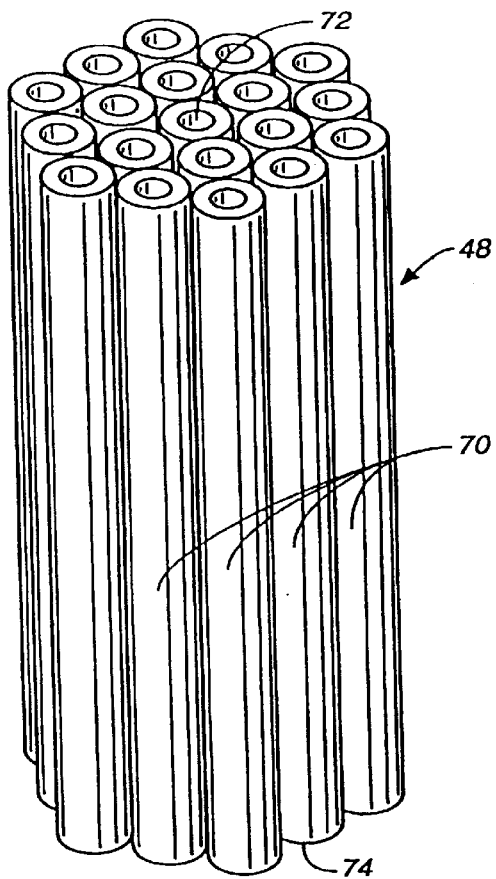
FIG._3
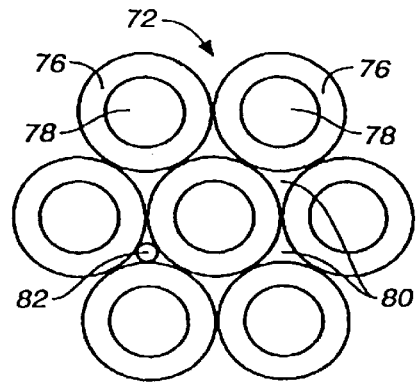
FIG._4
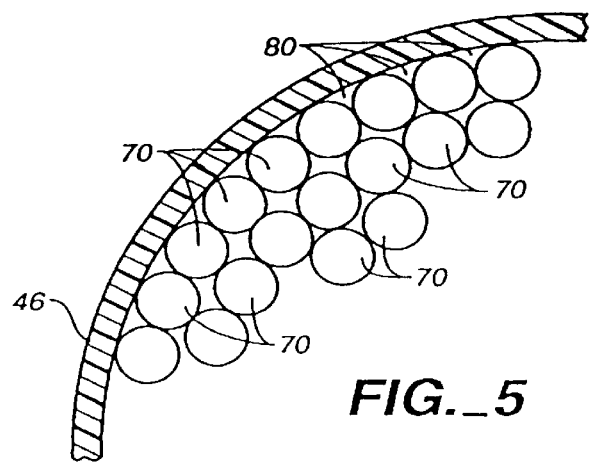
FIG._5

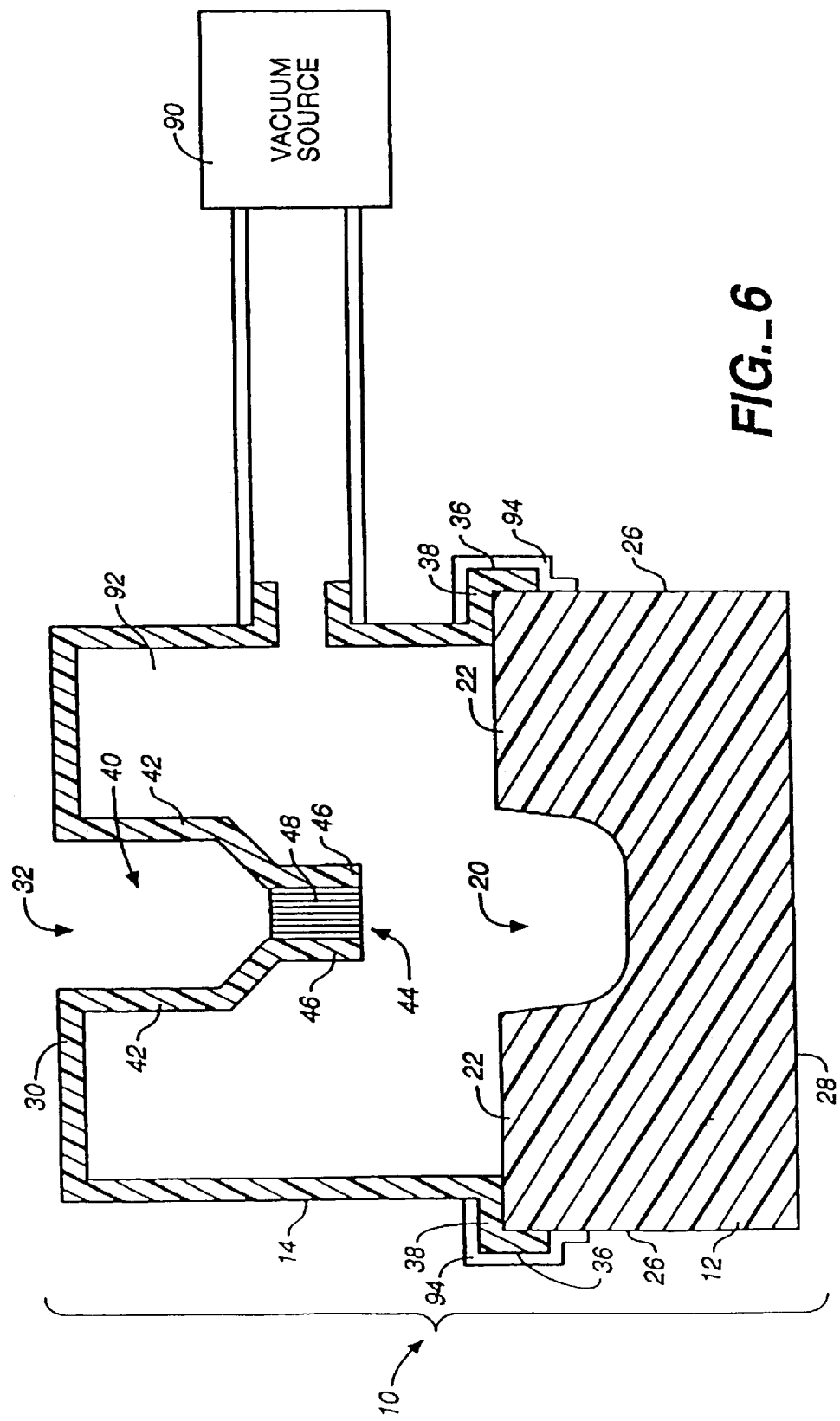
FIG._6

SIMULTANEOUS FILTRATION OF NUMEROUS SAMPLES USING MICROFIBERS

FIELD OF THE INVENTION

This invention relates generally to filtration devices, and specifically to a filtration apparatus which can be operated to simultaneously filter one or more small fluid samples for extremely small particles.

BACKGROUND OF THE INVENTION

Various filtration devices have been developed which separate fluid constituents from each other or which separate fragments of fluid constituents from a fluid sample for recovery and analysis. For example, U.S. Pat. No. 5,846,493 to Bankier et al. describes a filtration system which utilizes a vacuum to draw a solution through a fibrous web filter to separate DNA particles from the solution. U.S. Pat. No. 4,948,564 to Root et al. and U.S. Pat. No. 5,141,719 to Fernwood et al. disclose filtration systems which utilize centrifugation, gravity, or vacuum to filter fluid samples through a microporous membrane filter. U.S. Pat. No. 5,160,704 to Schluter describes a serum separator which comprises a filter of vertically aligned fibers of absorbent material covered by a layer of dense acetate fabric. When the cell particle separator is lowered into a fluid sample, capillary action in the aligned fibers draws fluid into the filter, capturing larger particles which cannot be drawn into the filter against the layer of dense acetate fabric.

Some known filtration devices can be used in DNA filtration projects to filter samples containing DNA particles for recovery of genetic structures. However, known filters used in DNA retrieval systems typically provide a DNA particle recovery rate of 80% or less, and require substantial sample volumes (i.e., 100 microliters or more) to produce significant extraction volumes. Given that a year's development may be needed to produce even very small amounts (on the order of a few picograms) of fluid containing the desired DNA particles, the loss of DNA material due to inefficiencies in filtration and the inability to divide fluid portions into smaller sample volumes to produce more extractions are significant disadvantages.

Accordingly, it is a primary object of the current invention to provide a filtration apparatus which optimizes particle recovery from fluid samples.

A further object of the current invention is to provide a filtration system which can filter particles from sample fluid volumes of 50 microliters or less.

Another object of the current invention is to provide a filtration system which allows for the simultaneous filtration of numerous samples.

Other objects and advantages of the current invention will become apparent when the inventive filtration system is considered in conjunction with the accompanying drawings, specification, and claims.

SUMMARY OF THE INVENTION

A filtration apparatus for extracting particles from a fluid sample is provided. The filtration apparatus comprises a filtration well plate which forms one or more filtration wells. Each filtration well has a proximal chamber into which the fluid sample may be deposited and a distal channel into which a filter is fitted. Each filter comprises a plurality of vertically oriented cylindrical micro fibers defining a set of vertically oriented linear pores. Upon application of a sufficient downward force to the fluid sample, the fluid sample is driven into the filter and the particles are expelled from a lower end of the filter.

BRIEF DESCRIPTION OF THE DRAWINGS

FIG. 1 is a cross-sectional side view of the inventive filtration apparatus, comprising an extraction well plate, a filtration well plate, and a lid.

FIG. 2 is a top plan view of the filtration well plate of FIG. 1.

FIG. 3 is a perspective and schematic view of the cohesively bundled micro fibers which form the inventive filter.

FIG. 4 is a top plan view of the micro fibers schematically showing the pores formed as the interstices between the cohesively bundled micro fibers.

FIG. 5 is a top plan view of the micro fibers as compressed against the sides of a filtration well in the filtration well plate.

FIG. 6 is a cross-sectional side view of an alternative embodiment of the inventive apparatus which employs vacuum to induce filtration.

DESCRIPTION OF THE PREFERRED EMBODIMENT

Referring to FIGS. 1 and 2, a preferred embodiment 10 of the inventive filtration apparatus is shown. Apparatus 10 is designed for use in conjunction with a centrifuge to induce filtration. Apparatus 10 comprises extraction well plate 12, filtration well plate 14, and lid 16.

Extraction well plate 12 forms extraction wells 20 in its upper surface 22 which are designed to receive material 24 extracted in the filtration process. Extraction wells 20 are configured in a standard 12×8 array with a spacing $d_1$ of approximately 9 millimeters separating the centers of each two adjacent extraction wells. That well spacing is compatible with many types of standard laboratory equipment. It should be understood, however, that any number and configuration of extraction wells 20 may be used in the inventive apparatus 10. For example, extraction well plate 12 could form a single extraction well 20, or could form a 24×16 array of 384 extraction wells.

The width $d_2$ of each extraction well 20 at its top should be sufficient to allow the entry of laboratory equipment used to add or remove material from the extraction well 20, and to ensure that material 24 extracted during filtration collects in extraction wells 20 rather than contacting upper surface 22 of extraction well plate 20. Extraction wells 20 should have sufficient volume to store the full volume of extracted material 24, but should be sufficiently shallow that extracted material 24 is accessible to other laboratory equipment. Extraction wells 20 are preferably rounded so that extracted material will tend to collect in the center of the bottom of each extraction well 20.

If desired, a removable container (not shown) could be fitted into an extraction well 20 before filtration, so that extracted material 24 would collect in the removable container. The container could then be removed from extraction well plate 12 for further processing.

Extraction well plate 12 should be constructed from a chemically non-reactive and durable material. Suitable materials include, but are not limited to, plastics such as polypropylene, polystyrene, and polycarbonate. Polycarbonate is particularly suitable where the samples to be filtered include organic solvents, as polycarbonate is resistant to organic solvents. Additionally, polystyrene and polycarbonate, which are clear materials, enable a human user to detect readily the presence or absence of extracted material 24 in extraction wells 20.

The size of extraction well plate 12 and the shaping of its side walls 26 and lower surface 28 can be chosen as desired for convenient handling by human users and for compatibility with other devices, such as a centrifuge into which the inventive apparatus is placed. Preferably lower surface 28 is planar so that it may be stably rested on a flat supporting structure such as a counter or table top.

Filtration well plate 14 has an upper surface 30 forming filtration wells 32 each of which registers with an extraction well 20 when filtration well plate 14 is positioned over extraction well plate 12. The number and configuration of filtration wells 32 is preferably chosen to match the number and configuration of extraction wells 20.

Four side walls 34 of filtration well plate 14 each form a vertical flange 36 which engages a side wall 26 of well plate 12, and a horizontal shoulder 38 which engages the upper surface 22 of extraction well plate 12. When filtration well plate 14 is fitted atop extraction well plate 12, the bottom of each filtration chamber 32 is positioned at a predetermined distance $d_3$ above the corresponding extraction well 20.

Each filtration well 32 has a proximal chamber 40 defined by walls 42, a distal channel 44 defined by walls 46, and a special filter 48 fitted into distal channel 44. Filter 48 is preferably press fit into distal channel 44 to avoid the use of adhesives or the like in the inventive apparatus 10. Proximal chamber 40 is open at its top, such that it can receive a fluid sample 50. Proximal chamber 40 should have sufficient width $d_4$ to accommodate the insertion of laboratory equipment used to deposit the fluid sample, such as a pipettor. Distal channel 44 is open at its bottom, so that upon filtration, extraction materials drawn through filter 48 exit distal channel 44 and fall into the corresponding extraction well 20. Walls 42 may be sloped towards distal channel 44 to guide the fluid sample 50 towards filter 48 during filtration. The filter 48 is discussed in detail below.

Lid 16 is fitted over the upper surface 30 of filtration well plate 14 once fluid samples 50 are delivered into filtration wells 32. Lip 60 of lid 16 engages the outer edge of filtration well plate 14 when lid 16 is secured atop filtration well plate 14. Preferably, lid 16 forms seals 62 shaped and positioned to correspond to the contours of walls 42 of the filtration wells 32 such that filtration wells are each separately sealed by said lid 16 to prevent cross-contamination of liquid samples 50.

Filtration well plate 14 and lid 16 also should be constructed from chemically non-reactive and durable materials. Suitable materials include, but are not limited to, plastics such as polypropylene, polystyrene, and polycarbonate.

Referring to FIG. 3, filter 48 comprises a plurality of cylindrical micro fibers 70 all oriented along a common axis. Micro fibers 70 are positioned as adjoining columns so that they do not tangle about each other. Each filter 48 is fitted into the distal channel 44 of a filtration well 32 such that the micro fibers are oriented vertically with regard to the filtration well 32. Upper ends of micro fibers 70 form an upper end 72 of filter 48 and the lower surfaces of micro fibers 70 form a lower end 74 of filter 48.

Micro fibers 70 are preferably hydrophobic. Referring to FIG. 4, micro fibers 70 may each comprise an outer coating 76 of a hydrophobic material and a core 78. In a preferred embodiment, outer coating 76 is formed of polyethylene and core 78 is formed of polypropylene. The polypropylene core 78 adds strength to micro fibers 70 and is a relatively low-cost material, while the polyethylene outer coating 76 makes the micro fibers 70 hydrophobic. As an alternative example, micro fibers 70 may be comprised entirely of polyethylene.

Micro fibers 70 form pores 80 in the interstices both between individual micro fibers, as shown in FIG. 4, and between micro fibers 70 and walls 46 of distal channel 44, as shown in FIG. 5. A pore size for the filter 48 is defined by a pore diameter of a pore, shown in FIG. 4 as circle 82.

As micro fibers 70 are compressed upon insertion of filter 48 into distal channel 44, the pore size of the filter 48 when fitted into distal channel 44 can be controlled by changing the diameter of distal channel 44 and/or changing the number of micro fibers 70 in the filter to reduce or increase the amount of compression of the micro fibers 70. The pore size for the filter 48 can be selected as desired for filtration depending on the characteristics of the fluid sample and the size of the particles being filtered. Pore sizes for the filter 48 in the range of between 0.2 micrometers and 2 micrometers will be suitable for many DNA filtration applications.

In operation, filtration well plate 14 is fitted atop extraction well plate 12 by engaging flanges 36 with side walls 26, positioning each filtration well 32 above an extraction well 20. A fluid sample 50 is then introduced into the proximal chamber 40 of each filtration well 32. Fluid samples 50 may be added by hand or using automated equipment. The pore size of filter 48 is sufficiently small that surface tension prevents the passage of fluid sample 50 into filter 48 due to gravity. The hydrophobicity of the filter 48 contributes to preventing fluid entry into filter 48. At this point, filtration wells 32 are filled and extraction wells 20 are empty, as shown in the left hand side of FIG. 1. Lid 16 is then fitted over filtration well plate 14, sealing each filtration well 32 and preventing cross contamination of the fluid samples 50.

The entire apparatus 10 is then placed into a centrifuge such that lid 16 faces the axis of rotation of the centrifuge. Preferably, the centrifuge includes structures which hold the extraction well plate 12 and the filtration well plate 14 together. If there is any danger that the extraction well plate 12 and filtration well plate 14 may become misaligned at the commencement or during centrifugation, additional structures such as clamps, pins, bolts, or the like may be used to secure the two plates together.

The centrifuge is then activated, increasing rotation speed until sufficient centrifugal force is created to counteract the surface tension and drive fluid sample 50 into the top end 72 of filter 48. The necessary force will vary depending upon the characteristics of the fluid sample 50 and the selected pore size of the filter 48. Rotating the centrifuge to accelerate the fluid sample by between 500 and 10,000 g's will typically be sufficient to cause filtration. As the fluid sample 50 passes through pores 80 of filter 48, large particles in the fluid sample 50 become trapped in pores 80, while small particles pass through the pores 80, are expelled from the bottom end 74 of filter 48, and collected in the corresponding extraction well 20. The hydrophobicity of the outer coating 76 of the micro fibers 70 tends to repel the fluid sample 50 and prevents entrapment of the smaller particles capable of passing through pores 80 in filter 48. With most standard porous filters, wherein the pores of the filter wind a tortuous path through the filter, small particles may become trapped in the jumbled pore structure. In contrast, the linearly aligned pores 80 of the subject filter pass directly through the filter, improving the reliability with which small particles are extracted through the filter 48.

Accordingly, the inventive apparatus will provide a high recovery rate for small particles such as DNA fragments extracted from a fluid sample 50. Due to the filter's hydrophobicity and aligned fiber structure which makes particle size the significant factor in passage of material through the filter, very small fluid sample volumes may be filtered, such as fluid sample volumes of 1 microliter or less. (In this respect, the size of the fluid sample shown in FIG. 1 is exaggerated for clarity of illustration).

After centrifugation, the larger particles of fluid sample 50 remain retained in filter 48, while the material 24 extracted from fluid sample 50 has passed through filter 48 and is collected in extraction wells 20, as shown in the right hand side of FIG. 1. Apparatus 10 may then be removed from the centrifuge. Filtration well plate 14 and lid 16 may be lifted away from extraction well plate 12. The extracted material 24 may then be processed as desired. For example, in most DNA recovery procedures, the extracted DNA fragments in extraction well plate 12 will then undergo polymerase chain reaction amplification to generate larger amounts of the extracted DNA sample. The filtration plate 14 may then be discarded, or, if desired, subjected to further processing, for example, to test or extract the material remaining within filter 48.

FIG. 6 depicts an alternative embodiment of the inventive apparatus which employs a vacuum source 90 to draw a fluid sample 50 through filter 48. The alternative embodiment of FIG. 6 also illustrates an inventive apparatus which utilizes only one filtration well 32 and one extraction well 20. In this embodiment, filtration well plate 14 and extraction well plate 12 should be vacuum sealed together, defining a vacuum chamber 92 between the undersurface of filtration well plate 14 and the upper surface 22 of extraction well plate 12. This may be accomplished by fitting a seal 94 over the connection between the two plates, such as a rubber or neoprene seal.

A vacuum source 90 should then be connected to the inventive apparatus such that, when operated, it lowers the air pressure within the vacuum chamber 92. Vacuum source 90 may be any source capable of creating a vacuum; conceptually, vacuum source 90 can be as simple a device as a tube to which a user can apply suction by mouth. A preferred vacuum source is the central vacuum system of a building and a tube which may be connected to the filtration well plate 14 at flanges 96. This vacuum source 90 is efficient and is easily disconnected from the filtration well plate 14 after filtration. It should be understood that the vacuum source 90 could also access vacuum chamber 92 through a passageway made in extraction plate 12.

In operation, a fluid sample is deposited into the proximal chamber 40 of the filtration well 32. Vacuum source 90 is then activated to create a pressure differential between the atmosphere external to the inventive apparatus and the vacuum chamber 92. In this embodiment, it is preferred that no lid 16 is used so that the pressure of the external atmosphere upon the fluid sample remains constant during filtration. Once the pressure differential is made sufficiently great, a suction force will be created which will, like the centrifugal force generated by the centrifuge in the preferred embodiment, draw the fluid sample into filter 48 and draw the smaller particles in the fluid sample through the filter 48. Care should be taken that the extracted material is not pulled toward the access point to the vacuum source to such an extent that the extracted material is not collected in extraction well 20.

Although the foregoing invention has been described in some detail by way of illustration for purposes of clarity of understanding, it will be readily apparent to those of ordinary skill in the art in light of the teachings of this invention that certain changes and modifications may be made thereto without departing from the spirit or scope of the appended claims.

It is claimed:

1. A filtration apparatus for extracting particles from a fluid sample, comprising:
a filtration well plate forming one or more filtration wells, each filtration well having a proximal chamber into which the fluid sample may be deposited and a distal channel into which a filter is fitted, each filter comprising a plurality of vertically oriented cylindrical micro fibers defining a set of vertically oriented linear pores, such that upon application of a sufficient downward force to the fluid sample, the fluid sample is driven into the filter and the particles are expelled from a lower end of the filter.

2. The filtration apparatus of claim 1, wherein each micro fiber of each filter is hydrophobic.

3. The filtration apparatus of claim 2, wherein the fluid sample has a volume less than or equal to 50 microliters.

4. The filtration apparatus of claim 3, wherein the vertically oriented linear pores of each filter each have a pore size of between 0.2 micrometers and 2 micrometers.

5. The filtration apparatus of claim 4, further comprising an extraction well plate, said extraction well plate defining an extraction well corresponding to each filtration well of the filtration well plate, the filtration well plate detachably fixable atop the extraction well plate such that each filtration well of the filtration well plate registers with a corresponding extraction well.

6. The filtration apparatus of claim 5 wherein said filtration well plate forms 96 of said filtration wells in a first 12×8 array and wherein said extraction well plate forms 96 of said extraction wells in a second 12×8 array, the 96 filtration wells of the first 12×8 array registering with the 96 filtration wells of the second 12×8 array when the filtration well plate is fitted atop the extraction well plate.

7. The filtration apparatus of claim 6, further comprising a lid, the lid detachably fixable over the filtration well plate.

8. The filtration apparatus of claim 7 wherein the lid has a lower surface and wherein seals corresponding to each filtration well of the filtration well plate are formed on the lower surface of the lid, the seals sealingly engaging the filtration wells when the lid is fixed over the filtration well plate.

9. The filtration apparatus of claim 8 wherein the vertically oriented cylindrical micro fibers of the filter are formed from polyethylene.

10. The filtration apparatus of claim 8 wherein the vertically oriented cylindrical micro fibers comprise an outer coating and a core.

11. The filtration apparatus of claim 10 wherein the outer coating of the vertically oriented cylindrical micro fibers is polyethylene and the core of the vertically oriented cylindrical micro fibers is polypropylene.

12. The filtration apparatus of claim 5 wherein said filtration well plate forms 384 of said filtration wells in a first 24×16 array and wherein said extraction well plate forms 384 of said extraction wells in a second 24×16 array, the 384 filtration wells of the first 24×16 array registering with the 384 filtration wells of the second 24×16 array when the filtration well plate is fitted atop the extraction well plate.

13. The filtration apparatus of claim 2, wherein the fluid sample has a volume of less than or equal to 1 microliter.

14. A method of filtering a fluid sample utilizing a filtration apparatus, the filtration apparatus comprising a filtration well plate and an extraction well plate, the filtration well plate forming one or more filtration wells, each filtration well having a proximal chamber into which the fluid sample may be deposited and a distal channel into which a filter is fitted, each filter comprising a plurality of vertically oriented cylindrical micro fibers defining a set of vertically oriented linear pores, the extraction well plate defining an extraction well corresponding to each filtration well of the filtration well plate, the filtration well plate detachably fixable atop the extraction well plate such that each filtration well of the filtration well plate registers with a corresponding extraction well, the lid detachably fixable over the filtration well plate, the method comprising:

fitting the filtration well plate atop the extraction well plate;

depositing a fluid sample into the proximal chamber of each filtration well of the filtration well plate; and applying, for each fluid sample, a force to the fluid sample which is directed towards the filter fitted into the filtration well into which the fluid sample was deposited until each fluid sample has filtered through the filter, producing an extraction of material collected in the corresponding extraction well.

15. The method of claim 14 wherein the force applied to each liquid sample is generated by accelerating the liquid sample by between 500 and 10,000 g's.

16. The method of claim 15 wherein the filtration apparatus further comprises a lid and further comprising the step of fitting the lid over the filtration well plate after the step of depositing a fluid sample into the proximal chamber of each filtration well and before the step of applying a force to each fluid sample.

17. The method of claim 16 wherein the step of applying a force to each fluid sample comprises the substeps of:

inserting the filtration apparatus into a centrifuge; and rotating the centrifuge to create the force applied to each fluid sample.

18. The method of claim 14 wherein the filtration well plate is sealingly engaged with the extraction well plate such that the filtration well and the extraction well form a vacuum chamber therebetween, wherein the filtration apparatus is fixable to a vacuum source such that when the vacuum source is activated, the vacuum source creates a vacuum in the vacuum chamber, and wherein the step of applying a force to each fluid sample comprises the substeps of:

fixing a vacuum source to the filtration apparatus;

activating the vacuum source to create a vacuum in the vacuum chamber, the vacuum in the vacuum chamber creating the force applied to each fluid sample.

* * * * *